United States Patent [19]

Quilliam

[11] 3,827,033

[45] July 30, 1974

[54] SEMI-CONDUCTOR MEMORY DEVICE ARRANGEMENTS

[75] Inventor: Robert Mark Quilliam, Chelmsford, England

[73] Assignee: The Marconi Company Limited, Chelmsford, Essex, England

[22] Filed: Dec. 15, 1972

[21] Appl. No.: 315,588

[30] Foreign Application Priority Data

Dec. 18, 1971 Great Britain .................... 58943/71

[52] U.S. Cl. ...... 340/173 R, 340/173 NR, 307/317, 307/238

[51] Int. Cl. .......................................... G11c 11/36

[58] Field of Search.... 340/173 R, 173 FF, 173 NR; 307/206, 317, 238

[56] References Cited

UNITED STATES PATENTS

| | | | |
|---|---|---|---|
| 3,387,298 | 6/1968 | Kruy | 340/173 R |
| 3,571,809 | 3/1971 | Nelson | 340/173 R |
| 3,573,757 | 4/1971 | Adams | 340/173 R |

*Primary Examiner*—Terrell W. Fears
*Attorney, Agent, or Firm*—Baldwin, Wight & Brown

[57] ABSTRACT

A memory device array including two sets of conductors, a plurality of amorphous semi-conductor memory devices each associated with an individual pair of conductors chosen one from each set and having a first electrode connected to each of the associated pair of conductors through a respective resistor, and means for enabling connection of a second electrode of each of the devices to a source of potential.

18 Claims, 6 Drawing Figures

SEMI-CONDUCTOR MEMORY DEVICE ARRANGEMENTS

This invention relates to semi-conductor memory device arrangements, and more particularly to arrays of such memory devices wherein each memory device includes an amorphous semi-conductor element.

In known such memory device arrangements a large number of memory devices which are required to form an information store are arranged in such a way that the number of connections required to read, write or erase information in each memory device is a minimum. This is normally achieved by utilising an X-Y matrix of connections, and a portion of such a matrix is illustrated in FIG. 1 of the accompanying drawings.

Referring to FIG. 1 there is a first set of parallel conductors $X_1$, $X_2$, $X_3$ extending in one direction, and a second set of parallel conductors $Y_1$, $Y_2$, $Y_3$ extending in a direction perpendicular to the direction of the first set of conductors. Where each of the conductors of the first set crosses a conductor of the second set there is a memory device A-I connected between the two conductors in question. Any particular memory device, F say, for the sake of example, can be addressed by selecting the conductors $X_2$, $Y_3$, that are both connected to the memory device F and by applying the currents required to set, or reset the memory device, or to read the impedance of the memory device.

In such memory device arrays it is known for each memory device to have two possible conditions, namely a conductive condition, when the resistance of the device is low, and a resistive condition, when the resistance of the device is high. When it is desired to determine which condition a particular memory device is exhibiting a potential is applied across the device by applying the potential to the appropriate pair of conductors, and the resultant current flow is measured.

Such memory device arrays, if they use two-way conductive devices, may have the disadvantage that if three of the memory devices, A, B and D say, are in the conductive state they will constitute a "sneak path" across the device E, and when a potential is applied across the conductors $X_2$ and $Y_2$ to determine the condition exhibited by the device E the resultant current flow will be such as to represent that the device E is in the conductive condition even if it is in the resistive condition. The reason for this is that when the device E is in the conductive state it will form a low resistance path between the conductors $X_2$ and $Y_2$, and when the device E is in the resistive state a low resistance path between the conductors $X_2$ and $Y_2$ will be formed by the series circuit including the device D, the conductor $Y_1$, the device A, the conductor $X_1$, and the device B. Provided that the series resistance of the devices D, A and B is still small compared with the non-conducting resistance of memory device E, then the "sneak-path" will appear across the conductors $X_2$ and $Y_2$ like a conductive memory device E.

An additional disadvantage of this "sneak-path" is that it will also present a conductive path to pulses of potential applied to the conductors $X_2$, $Y_2$ to change the state of the memory device E from one condition to the other short circuiting the device E and preventing its change of state.

To overcome these disadvantages it is known to provide an isolating diode in series with each memory device of an array such that there is then at least one reverse biased diode in each "sneak-path". Consequently the "sneak-path" no longer constitutes a low resistance path between the two conductors in question, and thus each memory device can be addressed individually if the requisite potentials are applied to the appropriate pair of conductors.

The provision of diodes, while improving the performance of a memory device array as described above, is associated with several disadvantages. There are problems associated with the production of the diodes since the memory devices are commonly formed by vacuum depositing the amorphous semi-conductor layer and the diodes are commonly formed from silicon. Also the isolation diodes have a capacitance which, in combination with the resistance of the conductors, which are normally formed from diffused conductive channels in a silicon substrate, serves to slow down the speed of reading of the array. The conductive channels also have a considerable capacitance, and where a large capacitance appears across a device during switching it may be possible for destructive effects to be experienced. In addition the resistance of the diffused channel across lines imposes a limit on the size of the array.

The invention seeks to provide an improved memory device array which avoids the use of diodes and therefore the disadvantages detailed above, but in which the problem of "sneak-paths" does nevertheless not arise.

According to this invention, there is provided a memory device array including two sets of conductors, a plurality of amorphous semi-conductor memory devices each associated with an individual pair of conductors chosen one from each set and having a first electrode connected to each of the associated pair of conductors through a respective resistor, and means for enabling connection of a second electrode of each of the devices to a source of potential.

The semi-conductor memory devices of a memory device array in accordance with the invention may be controlled in the manner described in our co-pending application 35454/71 in which a first voltage pulse is applied across a device which is to be made stably conductive, the voltage pulse having a pre-determined duration at least sufficient to drive the device into a conductive state immediately after which a lower magnitude voltage is applied across the device to maintain a current therethrough of such a level and for such a time as to render conductive state permanent. When the memory devices of a memory array in accordance with this invention are controlled in this manner, the first voltage pulse may be applied between the second electrode of the device to be set and one of the pair of conductors to which said first electrode of the device is connected, and the lower amplitude voltage may be applied subsequently between other conductor in the pair and the second electrode of the device for the direction of the low amplitude voltage. Alternatively the lower amplitude voltage may be applied as described only for a first part of its duration and for the remainder it may be applied between the second electrode and the same conductor to which the first voltage pulse is applied. The source of potential to which the second electrodes are connected in this case is earth, and all the other conductors of both of the sets of conductors are connected to earth potential while the device is being addressed. The device is addressed by a low impendance driver so that the other devices are effectively isolated and only the device directly associated with a conductor to which a voltage is applied will be affected by that voltage.

In the preferred embodiment of the invention, the sem-conductor memory device array is formed on a substrate. Preferably, the substrate carries a plurality of parallel conductors, alternate ones of which constitute one of said sets of conductors and the remaining alternate ones of which constitute said means for enabling connection of the second electrodes to a source of potential; a layer of insulating material, covering the substrate and the conductors, and having apertures therein where said layer is covering predetermined ones of the conductors; a plurality of amorphous semi-conductor memory device elements formed one in each of the apertures in said insulating layer where said layer is covering conductors which constitute said connecting means; metal electrodes formed on top of the memory device elements; a second plurality of parallel conductors which constitutes the other of said sets of conductors formed on the surface of said insulating layer; a first plurality of resistive elements each positioned to connect said metal electrodes of an individual device to an individual predetermined area of one of said first set of conductors through an aperture in said layer of insulating material and a second plurality of resistive elements each positioned to connect said metal electrode of an individual device to one of the conductors of said second plurality of conductors.

Preferably said conductors are of gold, or of gold deposited on top of chromium, or of molybdenum.

Preferably said insulating material is silicon oxide.

Preferably the amorphous semi-conductor material is chalcogenide glass.

A memory device array in accordance with the invention will now be described, by way of example, with reference to FIGS. 2 to 6 of the accompanying drawings in which, FIG. 2 is a diagrammatic representation of part of a semi-conductor memory device array;

Figure 1:
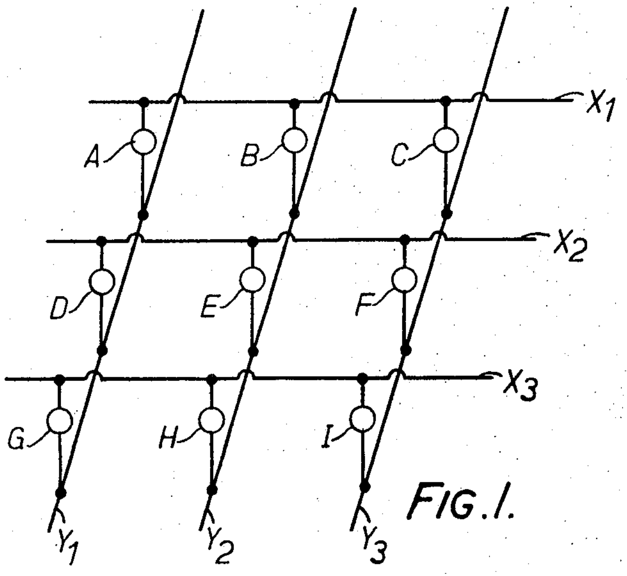
Figure 2:
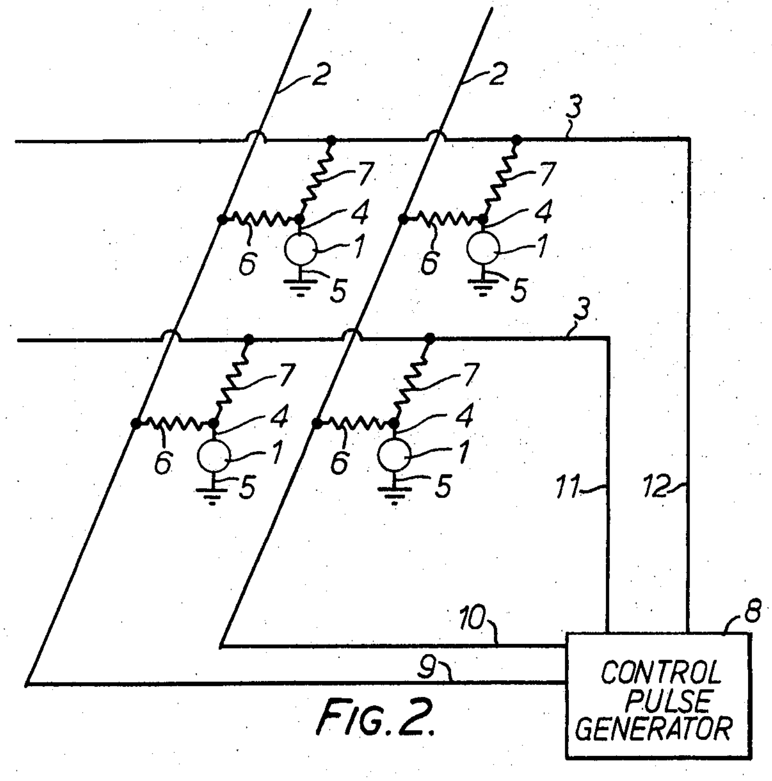

Referring to FIG. 2, a semi-conductor memory device array has several memory devices 1, only four of which are shown, and two sets of parallel conductors 2, 3 arranged to cross each other orthogonally. Each memory device 1 is associated with one conductor of the first set of parallel conductors 2, and one conductor of the second set of conductors 3 in such a way that each device 1 is associated with an individual pair of conductors 2, 3. Each memory device 1 is provided with two electrodes 4 and 5. Each electrode 4 is connected to the conductor 2 associated with the device 1 by a resistor 6, and is connected to the conductor 3 associated with the device 1 by a resistor 7. As diagrammatically shown the electrode 5 of each device 1 is connected to a reference potential, in this case earth potential by means not shown. Each of the conductors 2, 3 is connected to a low impedance control pulse generator 8, by leads 9, 10, 11 and 12, which is adapted to generate the voltage pulses necessary to write information into the memory array, to read any information thus stored, and to erase any information that is to be discarded from the memory array.

The memory devices 1 constituting the array are of the type described in the specification of our co-pending patent application No. 35454/71 and consist of an element of semi-conducting chalcogenide glass material. In the invention of the latter co-pending application in order to render the device stably conductive a voltage pulse is applied to the device for a predetermined time sufficient to render the device conductive and a subsequent lower magnitude voltage pulse is applied across the device to maintain a current flow of such level and duration as to render permanent the conductive state produced by the first pulse.

The operation of the arrangement illustrated in FIG. 2 will now be described with reference to FIG. 3. The waveform *a* is applied by a low impedance control pulse generator 8 between the reference earth and one of the conductor 3, e.g., the top one via lead 12. The waveform has a portion 13 of high amplitude and short duration — typically 10 μs which is sufficient to overcome the threshold voltages of the devices 1 associated with that conductor 3. The voltage pulse is passed through the resistors 7 to the electrode 4 of each device 1. The waveform *b* is supplied by the control pulse generator 8 and is applied between earth and those conductors 2 which are associated with devices 1 which have been rendered conductive by the waveform *a* and which are to be rendered permanently conductive. For the sake of example let us say that the waveform *b* is applied over lead 10 to the appropriate conductor 2. The waveform *b* has a portion 14 of low amplitude and of a duration which is typically 24 μ sec. The portion 14 of waveform *b* coincides with a portion 15 of the waveform *a* and serves to maintain the conductive state in any memory device to which it is applied and which was initially rendered conductive by the pulse 13 of waveform *a*. Any memory devices that are rendered conductive by the waveform *a* and which are not energised by the waveform *b* return to the resistive state during the portion 15 of the waveform *a*. Following the portion 15 of the waveform *a* there is a portion 16 of low amplitude and long duration — typically 100 m.s. which serves to make stable the conductive state maintained by portion 14 of waveform *b*. There is not sufficient time gap between portion 14 of waveform *b* and portion 16 of waveform *a* to cause the conductive devices to become non-conductive.

It can be seen that only a memory device 1 associated with a conductor 2 and a conductor 3 that are energised by the waveforms *b* and *a* respectively will be driven into the permanently conductive condition. All conductors 2 and 3 are held at earth potential whilst not being addressed, and the output impedance of the control pulse generator addressing voltage pulses to the chosen line is low compared with the impedance of the load resistors 6, 7.

Any path connecting an addressed line with a memory device which is not addressed must pass through the two load resistors 6, 7 associated with the device addressed and then via a line which is either held at earth potential or driven from a low impedance driver. Since this line is at low impedance compared with the resistors 6, 7 no voltage will appear other than on the lines being directly addressed and no "sneak-path" exists by which devices which are not desired to be addressed may receive a switching pulse.

Figure 3:
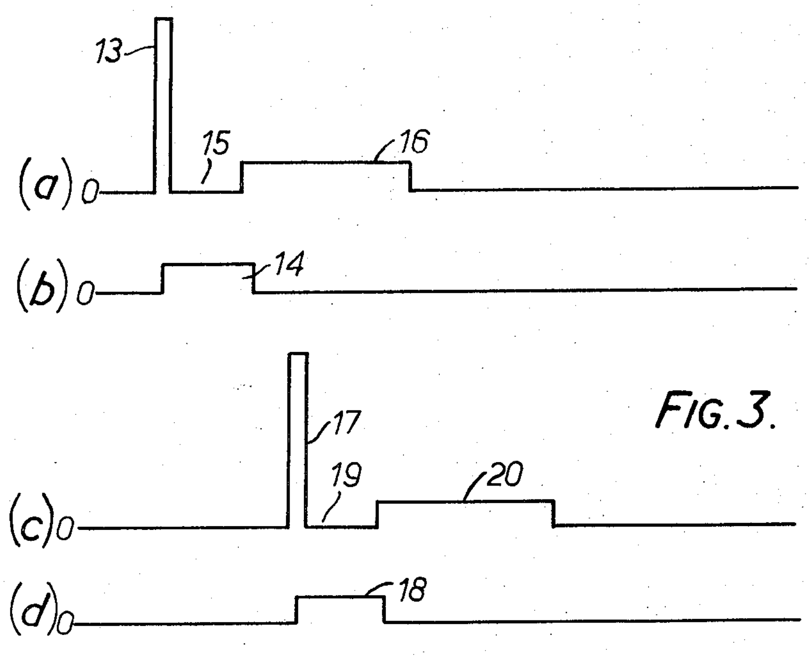
FIG. 3 is a graphical representation of voltage waveforms used in the operation of the array of FIG. 2.

Referring to FIG. 3 it can be seen that the waveforms *c* and *d* have portions 17, 18, 19 and 20 which correspond directly with the portions 13, 14, 15 and 16 of the waveforms *a* and *b*. If the waveforms *c* and *d* are fed to the array over the leads 11 and 9 respectively the device 1 associated with the appropriate conductors 2 and 3 will be rendered permanently conductive.

The first part of the switching pulse *a* (the part labelled 13 in FIG. 3) may, by itself, be of such a nature as to cause a memory device in the "on" or conductive state to turn "off" unless the device subsequently receives the full setting pulse (14 + 16). For this reason it is necessary to address a matrix of the nature described by writing in one line of information at a time using a pulse of type *a* applied to a given conductor 3, devices which are to be converted to the stable conductive state and then simultaneously addressed on the appropriate conductors 2 by the waveform *b*. The whole matrix is addressed by applying this process line by line, successive lines being addressed by appropriate pairs of pulse waveforms equivalent to *c* and *d* which are delayed with respect to the pulse waveforms *a* and *b* applied immediately previously in the manner shown in FIG. 3. It should be noted that it is not necessary to wait the entire duration of pulse 16 (100 m.s.) before addressing the subsequent line since it is only necessary that pulses 14 and 17 should not overlap. This makes it possible to address an entire matrix at the rate of one line every (say) 40 $\mu$ secs, thus completing the addressing of, for instance, a 16 × 16 array in 0.64 m.s., the entire matrix then receiving pulses 16, 20 etc., which convert the addressed devices into the stable conductive state, during the subsequent 100 m.s.

If the first part of pulse *a* (i.e., pulse 13) is deliberately arranged to be of such a nature as to cause a device in the "on" state to switch "off", then there is no need to make separate provision for erasing information already written in as this function will be performed automatically as fresh information is written in.

However, if it is required solely to erase information this is achieved by applying a sufficiently high potential to all of the conductors 2 for a sufficiently long time to drive all the memory elements into such a state that they will all return to the resitive state at the termination of the pulse. Alternatively, if it is desired to erase the information from just one line of devices only one conductor 2 or 3 can be energised by a high potential as described above.

An alternative addressing technique is to supply 10 $\mu$ sec pulses of large amplitude on the leads 11 and 12, and to supply 100 m.s. pulses of lower amplitude on the leads 9 and 10. By utilising such a system the time taken to address the whole of the array is increased over the time taken by the above described system, but such a system may prove satisfactory in certain applications.

In order to read the information stored in any device 1 a voltage V is applied to the conductor 2 associated with the device, and all the other conductors 2 are held at earth potential. Whether the device is in the conductive or non-conductive state is indicated by the voltage appearing on the appropriate conductor 3.

If the device is in the conductive state then the voltage on conductor 3 will be approximately earth potential since the voltage across the device will be very small assuming that the conductive resistance of the device is very small compared with the resistance 6. When the device is non-conductive a relatively high voltage will appear across the device and hence on the conductor 3. The ratio of the voltages on output 3 for a non-conductive and a conductive device will depend upon the relative resistances of the load resistance and the conductive and non-conductive resistance of the device. The more devices there are connected to a line 3 the lower will be the amplitude of the output voltages since each device will constitute a parallel path. However, the ratio of "on" to "off" voltage will remain substantially constant and one can still achieve high discrimination by suitable choice of resistance values.

The voltage applied during reading must, of course, be sufficiently low in amplitude as not to cause switching of the devices.

Figure 4:
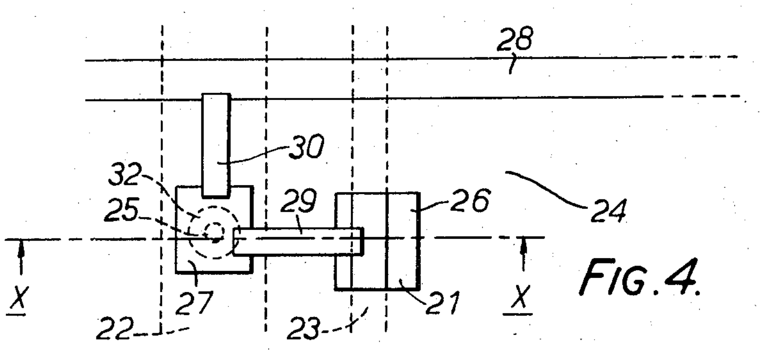
FIG. 4 is a diagrammatic plan view of one embodiment of one device of a semi-conductor memory device array in accordance with the present invention, and, FIGS. 5 and 6 are diagrammatic sectional views of the embodiment of FIG. 4 along the line X—X at different stages during the manufacture thereof.
Figure 5:
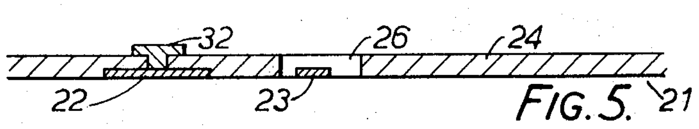
Figure 6:
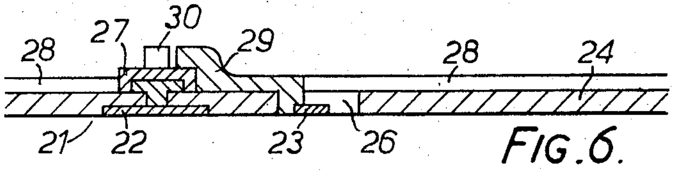

Referring to FIGS. 4, 5 and 6, a semi-conductor memory device array fabricated in thin film form will now be described. It is to be understood that the figures are diagrammatic and are not to scale. Like references refer to like parts throughout the drawings, and each figure shows only one memory device, for the sake of clarity. Many such memory devices would be formed adjacent to each other, arranged in orthogonal rows and columns, to form a memory device array.

A substrate 21 is provided with two sets of parallel conductors 22 and 23, formed of vacuum deposited gold, or gold deposited on top of chromium or molybdenum. A layer of insulating material 24 is then formed on the surface of the substrate, covering the conductors 22 and 23. This insulating material may be silicon oxide. Apertures 25 and 26 are then formed in the insulating layer 24 by a photolithographic and etching technique, well known per se. Aperture 25 reveals a predetermined area of the conductor 22, and the aperture 26 reveals a predetermined area of the conductor 23. A plug 32 of semi-conductor chalcogenide glass material forming a memory device element is then formed in the aperture 25. This is the stage of manufacture illustrated in FIG. 5.

A metal electrode plate 27 is then formed on the top surface of the plug 32 and, simultaneously a set of parallel conductors 28, orthogonal to the conductors 22 and 23, are formed on the surface of the insulating layer 24. These electrodes and conductors may be formed of vacuum deposited gold. Resistors 29 and 30 are then formed by depositing a suitable resistive material to form resistive paths between the electrode plate 27 and the conductors 23 and 28 respectively.

In the operation of the device illustrated the conductor 22 would be connected to earth, and the conductors 23 and 28 would correspond respectively to the conductors 2 and 3 of FIG. 2. It is to be understood that the duration of the various pulses that are specified in the above description are typical values only, and that pulses having very different durations may have the same effect on the memory devices.

I claim:

1. A memory device array comprising two sets of conductors, a plurality of semi-conductor memory devices each associated with an individual pair of conductors chosen one from each set and having a first and a second electrode, a plurality of pairs of resistors each associated with a respective memory device, each resistor in the pair connecting the said first electrode of the memory device to a respective one of the associated pair of conductors, each memory device being switchable from a first state to a second state in response to a bias waveform of predetermined and essentially uninterrupted time duration and having first and second components, said first component being of short duration relative to said predetermined time duration and of amplitude exceeding a predetermined value and said second component being of large duration relative to first component and of amplitude less than said predetermined value, and means for enabling connection of said second electrodes of the memory device to a source of potential providing separate portions of said bias waveforms.

2. A memory device array as claimed in claim 1, in which the array is formed on a substrate.

3. A memory device array as claimed in claim 2, in which the substrate carries a plurality of parallel conductors, alternate ones of which constitute one of said sets of conductors and the remaining alternate ones of which constitute means for enabling connection of the second electrodes to a source of potential; a layer of insulating material, covering the substrate and the conductor and having means defining apertures therein where said layer is covering pre-determined ones of the conductors; a plurality of amorphous semi-conductor memory device elements formed one in each of the apertures in said insulating layer where said layer is covering conductors which constitute said connecting means; metal electrodes formed on top of the memory device elements; a second plurality of parallel conductors which constitutes the other of said sets of conductors formed on the surface of said insulating layer; a first plurality of resistive elements each positioned to connect said metal electrodes of an individual device to an individual pre-determined area of one of said first set of conductors through an aperture in said layer of insulating material and a second plurality of resistive elements each positioned to connect said metal electrode of an individual device to one of the conductors of said second plurality of conductors.

4. A memory device array as claimed in claim 3 in which the conductors are of gold.

5. A memory device as claimed in claim 3 in which the conductors are formed by a layer of gold deposited on chromium or molybdenum.

6. A memory device array as claimed in claim 3 in which the said insulating material is silicon chromide.

7. A memory device array as claimed in claim 3 in which the amorphous semi-conductor material is chalcogenide glass.

8. In combination a memory device array comprising two sets of conductors, a plurality of semi-conductor memory devices each associated with an individual pair of conductors chosen one from each set and having a first and a second electrode, a plurality of pairs of resistors each associated with a respective memory device, each resistor in the pair connecting the said first electrode of the memory device to a respective one of the associated pair of conductors, and means for enabling connection of said second electrodes of the memory device to a source of potential, and a control voltage source for controlling the devices of the memory array into the conductive state, the said source being adapted first to apply across any device to be rendered stably conductive a first voltage pulse having a predetermined duration at least sufficient to drive the device into a conductive state and subsequently to apply a lower voltage to maintain a flow of current through the device of such a level and for such a time as to render the conductive state permanent.

9. A combination as claimed in claim 8, in which, to render the device conductive during operation, the first voltage pulse is applied between the second electrode of the device to be set and one of the pair of conductors connected to the first electrode of that device and the lower magnitude voltage is subsequently applied over at least part of its duration across the second electrode of the device and the other one of the pair of conductors.

10. A combination as claimed in claim 9 in which the lower magnitude voltage is applied during the first part of its duration via said other of the pair of conductors and for the remainder of its duration via said one of the pair of conductors.

11. A memory device array comprising, in combination:

two sets of conductors arranged as M number of $x$ lines and N number of $y$ lines each $x$ including N resistors and each $y$ line including M resistors, the resistors of the $x$ lines being connected to the resistors of the $y$ lines to define MN cross points;

a plurality of MN of semi-conductor memory devices each having first and second electrodes and the first electrodes of said memory device being connected individually to said cross points, each memory device being switchable from a first state to a second state in response to a bias waveform of selected and essentially uninterrupted time duration having successive first and second components, said first component being of small duration relative to said selected time duration and of amplitude exceeding a predetermined value and said second component being of large duration relative to said first component and of amplitude less than said predetermined value; and potential source means connected to said $x$ and $y$ lines and to said second electrodes of the memory devices for selectively applying bias waveforms to said memory devices, at least said first components of the selectively applied bias waveforms being applied to said $x$ lines and at least a portion of said second components of the selectively applied waveforms being applied to said $y$ lines whereby to write in information corresponding to the selectively applied waveforms.

12. A memory device array according to claim 11 wherein said potential source means applies said first components and a terminal portion of said second components to said $x$ lines and bridging portions of said second components to said $y$ lines.

13. A memory device array according to claim 12 wherein said potential source means includes means for sequentially applying a voltage less than said predetermined value to said $x$ lines while maintaining the remaining $x$ lines at reference potential and means for sequentially reading the potential appearing at said $y$ lines whereby individually to read the states of said memory devices.

14. A memory device array according to claim 11 wherein said potential source means includes means for sequentially applying a voltage less than said predetermined value to said $x$ lines while maintaining the remaining $x$ lines at reference potential and means for sequentially reading the potentials appearing at said $y$ lines whereby individually to read the states of said memory devices.

15. A memory device array as defined in claim 11 wherein said potential source means writes in information line-by-line.

16. A memory device array as defined in claim 12 wherein said potential source means writes in information line-by-line.

17. A memory device array as defined in claim 13 wherein said potential source means writes in information line-by-line.

18. A memory device array as defined in claim 14 wherein said potential source means writes in information line-by-line.

* * * * *